(12) United States Patent
Dudik et al.

(10) Patent No.: US 12,016,275 B2
(45) Date of Patent: *Jun. 25, 2024

(54) IRRIGATION SYSTEM HOSE-PULL APPARATUS

(71) Applicant: LINDSAY CORPORATION, Omaha, NE (US)

(72) Inventors: Matthew J. Dudik, Elkhorn, NE (US); Thomas J. Korus, Lindsay, NE (US)

(73) Assignee: Lindsay Corporation, Omaha, NE (US)

( * ) Notice: Subject to any disclaimer, the term of this patent is extended or adjusted under 35 U.S.C. 154(b) by 42 days.

This patent is subject to a terminal disclaimer.

(21) Appl. No.: 17/097,429

(22) Filed: Nov. 13, 2020

(65) Prior Publication Data

US 2021/0059133 A1    Mar. 4, 2021

Related U.S. Application Data

(63) Continuation of application No. 16/290,020, filed on Mar. 1, 2019, now Pat. No. 10,925,221.

(51) Int. Cl.
*A01G 25/09* (2006.01)
*B65H 75/36* (2006.01)
*B65H 75/44* (2006.01)

(52) U.S. Cl.
CPC .......... *A01G 25/097* (2013.01); *B65H 75/36* (2013.01); *B65H 75/4481* (2013.01); *B65H 2701/33* (2013.01)

(58) Field of Classification Search
CPC .. A01G 25/097; B65H 75/36; B65H 75/4481; B65H 2701/33
USPC .......................... 239/739, 735, 737, 743, 744
See application file for complete search history.

(56) References Cited

U.S. PATENT DOCUMENTS

| | | | | |
|---|---|---|---|---|
| 10,925,221 B2 * | 2/2021 | Dudik | ................... | A01G 25/097 |
| 2012/0286076 A1 * | 11/2012 | Korus | ..................... | F16L 35/00 |
| | | | | 239/743 |
| 2015/0328350 A1 * | 11/2015 | Hart | ........................ | B05B 1/046 |
| | | | | 239/8 |

* cited by examiner

*Primary Examiner* — Christopher S Kim
(74) *Attorney, Agent, or Firm* — Hovey Williams LLP

(57) ABSTRACT

A hose-pull apparatus for mounting to an irrigation system mobile tower supporting a fluid-carrying conduit. The hose-pull apparatus includes a swivel, a first pipe section, a joint, and a second pipe section. The swivel is configured to be in fluid communication with the conduit and rotate about a vertical axis. The first pipe section has a first end connected to the swivel and a second end extending outwardly from the swivel so that the first pipe section can pivot horizontally. The joint is connected to the second end of the first pipe section. The second pipe section has a first end connected to the joint so that the second pipe section can articulate relative to the first pipe section. The joint also has a second end configured to be in fluid communication with a supply hose.

18 Claims, 10 Drawing Sheets

IRRIGATION SYSTEM HOSE-PULL APPARATUS

RELATED APPLICATIONS

The present non-provisional patent application is a continuation of and claims priority to co-pending U.S. patent application Ser. No. 16/290,020, entitled "IRRIGATION SYSTEM HOSE-PULL APPARATUS", filed on Mar. 1, 2019, the entirety of which is hereby incorporated by reference into the present non-provisional patent application.

BACKGROUND

Linear irrigation systems include fluid-distribution conduits supported by mobile towers that are configured to travel across a field. Fluid-supply hoses provide water to the conduits and are connected to hydrants or other water sources. As the mobile towers travel across fields, the hoses are dragged alongside or behind one of the mobile towers.

Linear irrigation systems often move forwards and backwards across fields. For example, linear irrigation systems may reverse to escape ruts, to make multiple passes over fields for sufficient watering, or to return to their original positions.

Fluid-supply hoses often make traveling backwards difficult as they are prone to kinking when dragged from an extended orientation to a contracted orientation. Additionally, dragged hoses often form loops, which often enter the paths of the irrigation systems. Hoses therefore have to be monitored and re-positioned prior to and during reversing, which makes reversing time-consuming and impractical.

The background discussion is intended to provide information related to the present invention which is not necessarily prior art.

SUMMARY

The present invention solves the above-described problems and other problems by providing a hose-pull apparatus that prevents fluid-supply hoses from kinking or entering a path of an irrigation system mobile tower when the tower moves forwards or backwards, which enables and simplifies automatic and/or remote reversing of the irrigation system.

A hose-pull apparatus constructed in accordance with an embodiment of the present invention mounts to a mobile tower of an irrigation system and broadly comprises a swivel, a first pipe section, a joint, and a second pipe section. The swivel is in fluid communication with the conduit of the irrigation system and rotates about a vertical axis. The first pipe section is connected to the swivel and extends outwardly so that it can pivot horizontally. The joint is connected to the first pipe section and the second pipe section so that the second pipe section can articulate relative to the first pipe section. The second pipe section is in fluid communication with the hose so as to deliver fluids from the hose to the conduit of the irrigation system.

The swivel and joint work in conjunction to prevent the hose from kinking or entering the path of the irrigation system when the mobile tower moves forwards or backwards. When the hose is in an extended position and the irrigation system begins to reverse, the second pipe section articulates relative to the first pipe section via the joint to prevent the hose from kinking. The swivel allows the first pipe section to swing away from the path of the irrigation system as the irrigation system reverses, thereby guiding the hose out the path.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the present invention will be apparent from the following detailed description of the embodiments and the accompanying drawing figures.

BRIEF DESCRIPTION OF THE DRAWING FIGURES

Embodiments of the present invention are described in detail below with reference to the attached drawing figures, wherein.

Figure 1:
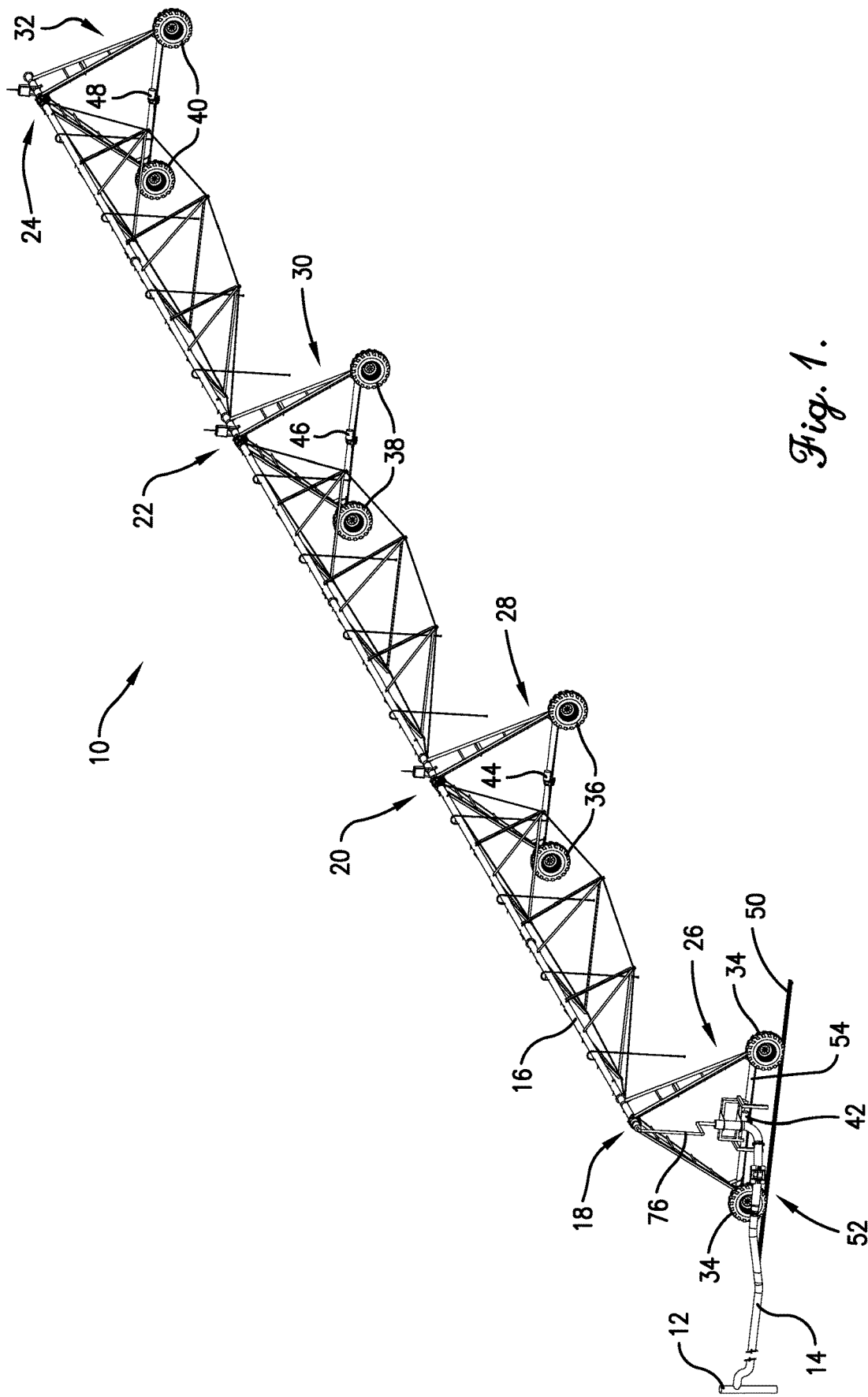
FIG. 1 is a perspective view of an exemplary irrigation system on which a hose-pull apparatus constructed in accordance with embodiments of the invention may be installed.

The drawing figures do not limit the present invention to the specific embodiments disclosed and described herein. The drawings are not necessarily to scale, emphasis instead being placed upon clearly illustrating the principles of the invention.

DETAILED DESCRIPTION OF THE EMBODIMENTS

The following detailed description of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The following detailed description is, therefore, not to be taken in a limiting sense. The scope of the present invention is defined only by the appended claims, along with the full scope of equivalents to which such claims are entitled.

In this description, references to "one embodiment", "an embodiment", or "embodiments" mean that the feature or features being referred to are included in at least one embodiment of the technology. Separate references to "one embodiment", "an embodiment", or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the present technology can include a variety of combinations and/or integrations of the embodiments described herein.

Turning to FIG. 1, an irrigation system 10 on which a hose-pull apparatus constructed in accordance with a first embodiment of the invention may be mounted is illustrated. The illustrated irrigation system 10 is a linear irrigation system but can be any other irrigation system known in the art, such as a central pivot irrigation system. The irrigation system 10 may have access to a hydrant, well, water tank, or other source 12 of water and may also be in fluid communication with a tank or other source of agricultural products to inject fertilizers, pesticides and/or other chemicals into the water for application during irrigation. The irrigation system 10 may be in fluid communication with the water source 12 via a fluid-supply hose 14. The irrigation system 10 may comprise a fluid-distribution conduit 16 in fluid communication with the hose 14 and a number of spaced-apart mobile towers 18, 20, 22, 24 configured to support and move the conduit 16 above a field.

Each mobile tower 18, 20, 22, 24 includes a frame 26, 28, 30, 32 for supporting a portion of the conduit 16, wheels 34, 36, 38, 40 attached to the frame 26, 28, 30, 32, and a motor 42, 44, 46, 48 for driving the wheels 34, 36, 38, 40 along a path 50 of the irrigation system 10.

Figure 2:
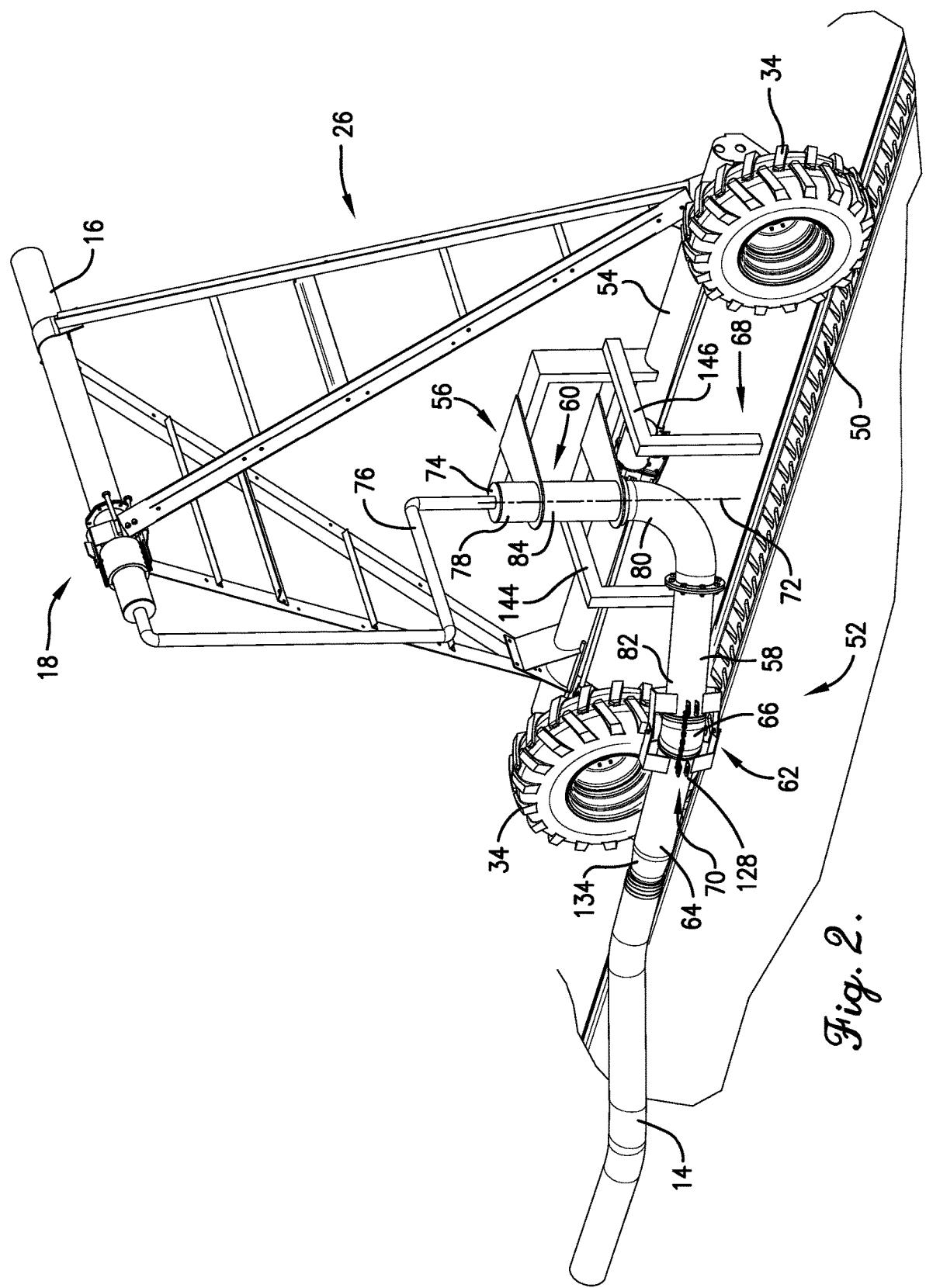
FIG. 2 is an elevated perspective view of a mobile tower of the irrigation system of FIG. 1 on which the hose-pull apparatus is mounted.

The hose-pull apparatus 52 is typically attached to the end-most mobile tower 18. As shown in FIG. 2, the hose-pull apparatus 52 is mounted to a frame member 54 extending between the wheels 34 of the mobile tower 18. The hose-pull apparatus 52 is provided for connecting the hose 14 to the conduit 16 of the irrigation system 10, preventing kinks in the hose 14, and keeping the hose 14 out of the path 50 of the mobile tower 18. The apparatus broadly comprises a swivel 56, a first pipe section 58, a sleeve 60, a joint 62, a second pipe section 64, a flexible hose 66, a swivel stop 68, and a joint stop 70.

The swivel 56 is configured to be in fluid communication with the conduit 16 and rotate about a vertical axis 72. The swivel 56 provides a sealed connection to a non-moving portion 74 of piping 76 that is in fluid communication with the conduit 16. The swivel 56 may include one or more bearings (not shown), or the like, that enable the swivel 56 to rotate. The swivel 56 may also include one or more gaskets (not shown) that enable the swivel 56 to maintain its sealed connection to the piping 76.

The first pipe section 58 pivots horizontally with the swivel 56 and includes a first end 78 coupled to the swivel 56, a length 80 extending downwardly through the sleeve 60, and a second end 82 extending substantially horizontally relative to the vertical axis 72. The first pipe section 58 is coupled to the swivel 56 so that the first end 78 and the length 80 can rotate about the vertical axis 72 with the swivel 56, and the second end 82 is able to pivot horizontally and be positioned at different angles relative to the frame member 54.

The sleeve 60 may provide substantially frictionless support to the first pipe section 58 and be attached to the frame member 54 of the tower 18. The sleeve 60 includes a channel 84 through which the length 80 of the first pipe section 58 extends. The sleeve 60 may include one or more bearings (not shown), or the like, for reducing friction between the sleeve 60 and the first pipe section 58 as the first pipe section 58 rotates. While the swivel 56 is depicted as being a rotatable coupling mechanism, the swivel 56 may include any device or apparatus that provides a sealed connection and enables the first pipe section 58 to swivel without departing from the scope of the present invention. For example, the swivel may include a hinge and flexible hose. The first end 78 of the first pipe section 58 may be connected to the non-moving portion 74 of the piping 76 via the flexible hose, and the sleeve 60 may be connected to the hinge and engage the first pipe section 58 so that the sleeve 60 and first pipe section 58 pivot horizontally via the hinge.

Figure 3:
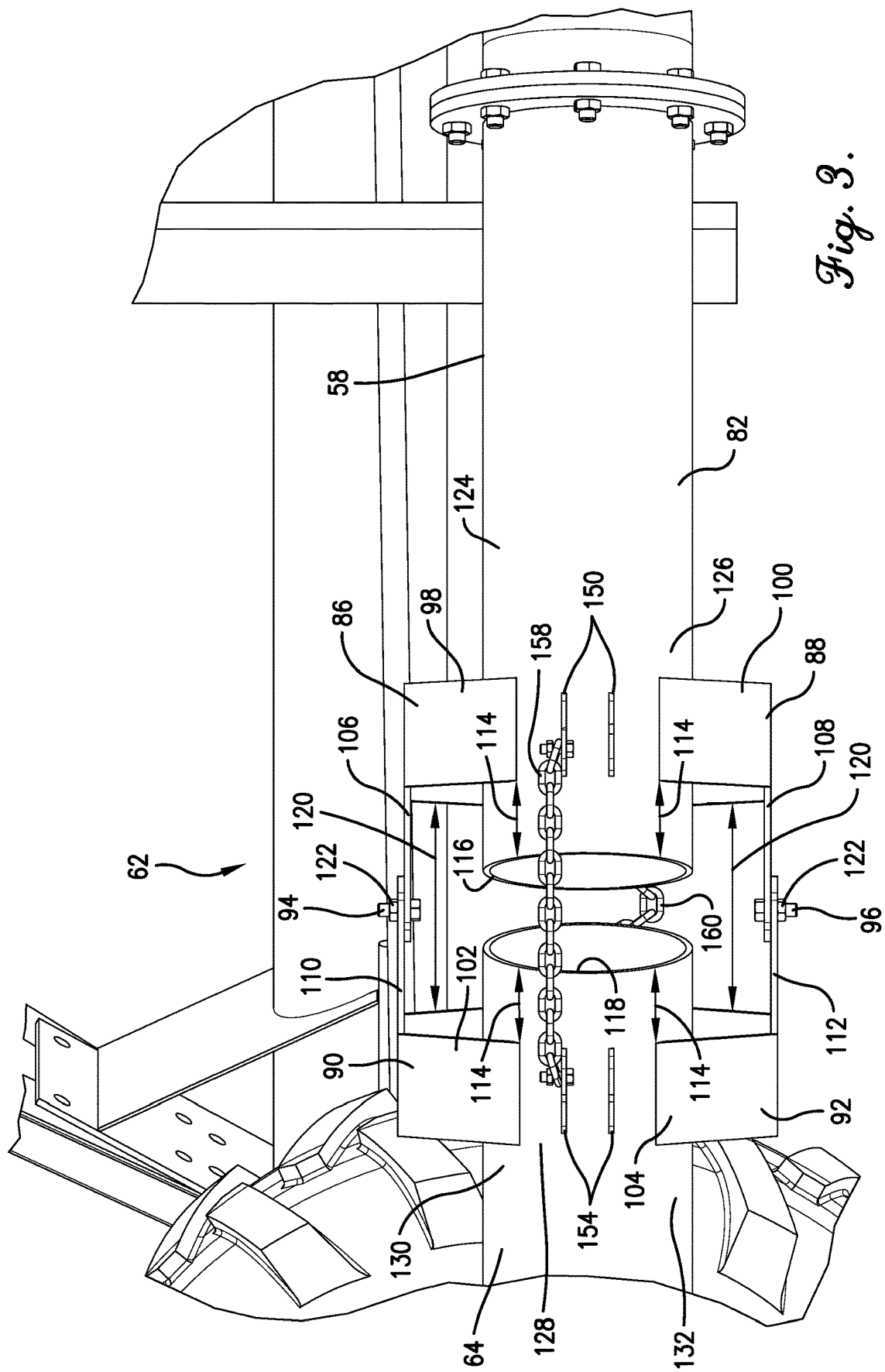
FIG. 3 is a side perspective view of a joint of the hose-pull apparatus of FIG. 2.

The joint 62 connects the first pipe section 58 and the second pipe section 64 so that the second pipe section 64 can articulate relative to the first pipe section 58. As shown in FIG. 3, the joint 62 may be a knuckle having two pairs of collars 86, 88, 90, 92 attached to the pipe sections 58, 64 and two pins 94, 96 pivotally connecting the collars 86, 88, 90, 92.

Each collar 86, 88, 90, 92 includes a platform 98, 100, 102, 104 and a leaf 106, 108, 110, 112. The platform 98, 100, 102, 104 is connected to its respective pipe section 58, 64 a distance 114 from the edge 116, 118 of its respective pipe section 58, 64. The platform 98, 100, 102, 104 has a height sufficient to provide space for the flexible hose 66 to fit over the respective pipe section 58, 64 below the leaf 106, 108, 110, 112. The distance 114 provides space for the flexible hose 66 to have a sufficient grasp of the respective pipe section 58, 64. Each leaf 106, 108, 110, 112 is connected to its respective the platform 98, 100, 102, 104 and extends from its platform 98, 100, 102, 104 past the edge 116, 118 of its respective pipe section 58, 64 a distance 120 long enough to allow the edges 116, 118 of the pipe sections 58, 64 to not touch when positioned within a desired range of articulation. Each leaf 106, 108, 110, 112 includes an aperture 122 for receiving its respective pin 106, 108.

The first pair of collars 86, 88 are attached to the second end 82 of the first pipe section 58. One collar 86 is attached to a top portion 124 of the pipe section 58, and the other collar 88 is attached to a radially opposite portion 126, or bottom portion 126, of the pipe section 58. The second pair of collars 90, 92 are attached to a first end 128 of the second pipe section 64. One collar 90 is attached to a top portion 130 of the pipe section 64, and the other collar 92 is attached to a radially opposite portion 132, or bottom portion 132, of the pipe section 64. The leaves 106, 110 of the top collars 86, 90 extend toward each other and are connected by pin 94. The leaves 108, 112 of the bottom collars 88, 92 extend toward each other and are connected by pin 96. The leaves 106, 108, 110, 112 and pins 94, 96 act as hinges between the pipe sections 58, 64 so that the second pipe section 64 can pivot horizontally relative to the first pipe section 58. While the joint 62 is described as being a knuckle-type joint, the joint 62 may be any device or configuration that enables the second pipe section 64 to pivot relative to the first pipe section 58 without departing from the scope of the present invention.

Figure 4:
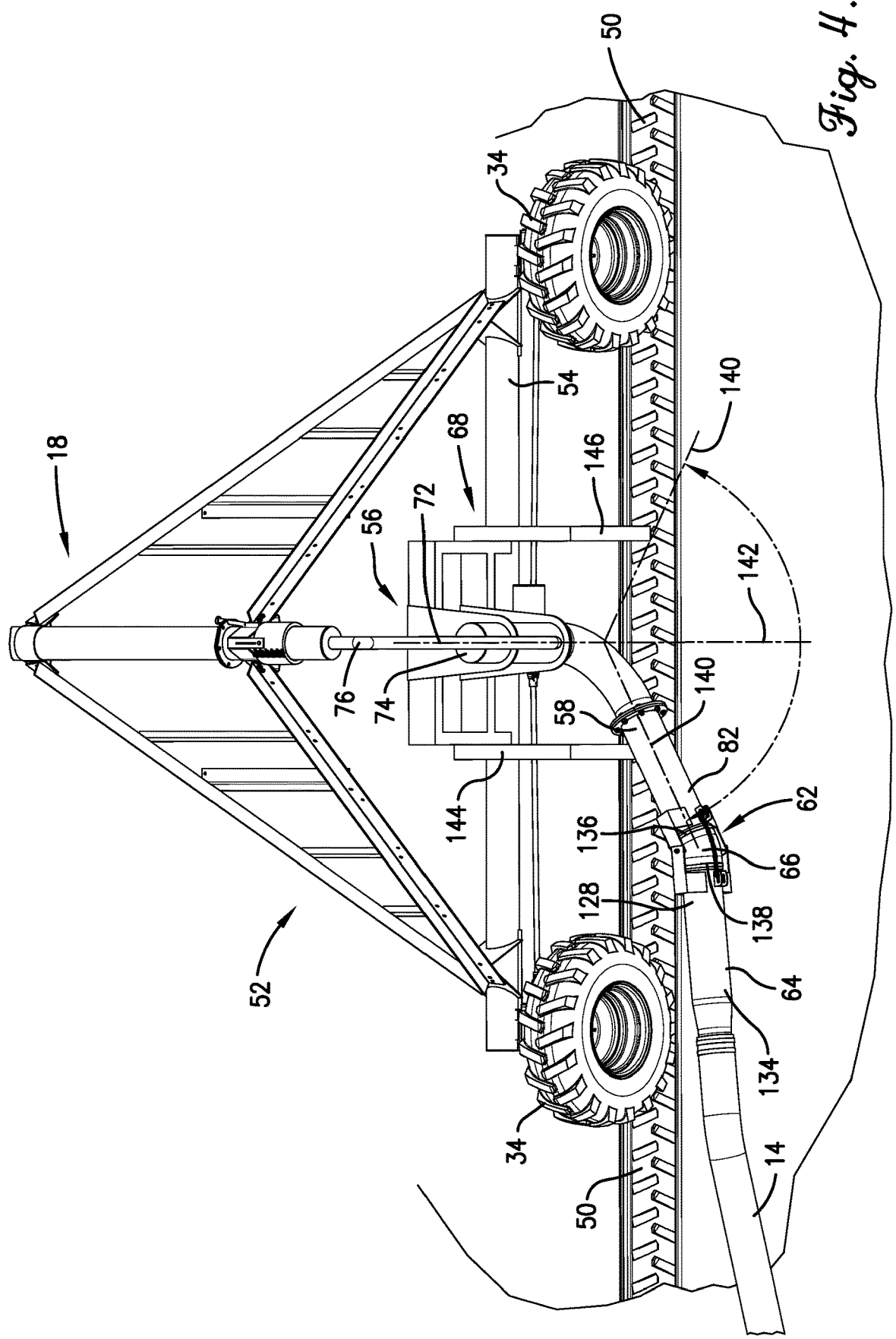
FIG. 4 is an elevated side perspective view of the mobile tower of FIG. 2.

Turning to FIG. 4, the second pipe section 64 is connected to the joint 62 and includes the first end 128 and a second end 134 extending away from the joint 62. As discussed above, the first end 128 is coupled to the joint 62. The second end 134 is configured to be in fluid communication with the hose 14. The second end 134 may be directly coupled to an end of the hose 14, or the second end 134 may be connected to additional joints and pipes sections. Additional joints and pipes sections may be connected to the second pipe section 64 to reduce compression and kinks, such as for hoses 14 having a larger diameter.

The flexible hose 66 provides a fluid connection between the first and second pipe sections 58, 64 that is bendable so that the pipe sections 58, 64 can pivot relative to each other without the flexible hose 66 becoming disconnected or kinking, as shown in FIG. 1. The flexible hose 66 may include a first end 136 connected to the second end 82 of the first pipe section 58, and a second end 138 connected to the first end 128 of the second pipe section 64.

The swivel stop 68 prevents the swivel 56 from swiveling beyond a maximum angle 140 relative to a center angle 142. The maximum angle 140 may be determined by the angle at which the one of the pipe sections 58, 64 or the hose 14 enter the path 50 of the wheels 34 of the mobile tower 18. The maximum angle 140 may be small enough so that when the hose 14 is coupled to the second end 134 of the second pipe section 64, the hose 14 does not enter the path 50 of the mobile tower 18. The maximum angle 140 may be large enough that when the hose 14 is coupled to the second end 134 of the second pipe section 64, the hose 14 does not kink when the mobile tower 18 is moving backward or forward.

The swivel stop 68 may include a pair of bump stops 144, 146 attached to the frame member 54 of the irrigation tower 18. The bump stops 144, 146 are positioned on the frame member 54 on each side of the swivel 56. The bump stops 144, 146 are positioned so as to abut the first pipe section 58 when the swivel 56 reaches the maximum angle 140 relative to the center angle 142. While the swivel stop 68 is described as including bump stops 144, 146, the swivel stop 68 may be any device or configuration that prevents the swivel 56 from swiveling beyond the maximum angle 140 without departing from the scope of the present invention. For example, the swivel stop 68 may include one or more flanges protruding from the swivel 56 and abutments on the non-moving portion 74 of the piping 76 that abut the flanges and prevent the swivel 56 from rotating beyond the maximum angle 140.

Figure 5:
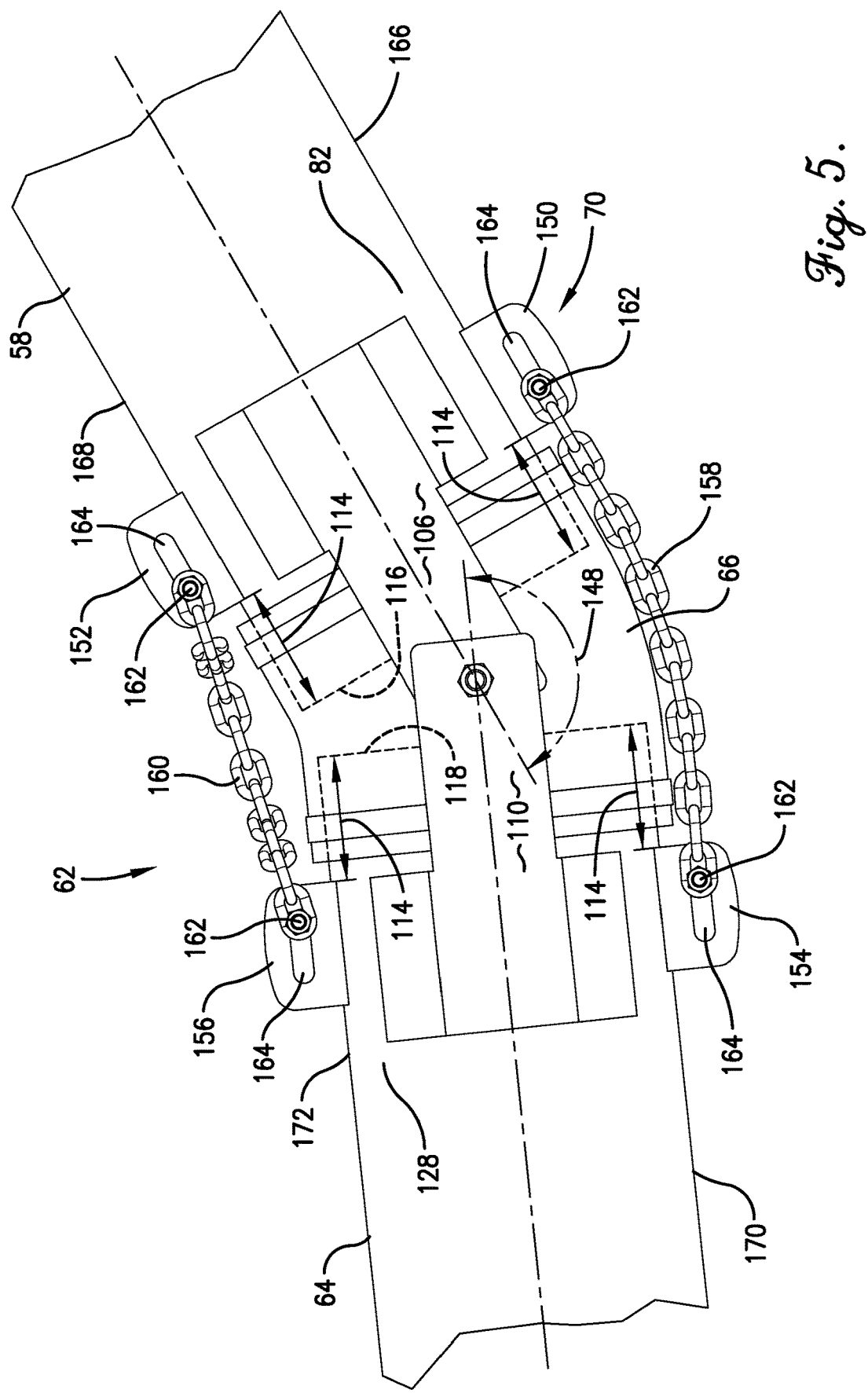
FIG. 5 is a top perspective view of the joint of the hose-pull apparatus of FIG. 3.

Turning to FIG. 5, the joint stop 70 prevents the second pipe section 64 from pivoting beyond a maximum angle 148 relative to the first pipe section 58. The maximum angle 148 may be small enough so that when the hose 14 is coupled to the second end 134 of the second pipe section 64, the hose 14 does not enter the path 50 of the mobile tower 18. The maximum angle 148 may be large enough that when the hose 14 is coupled to the second end 134 of the second pipe section 64, the hose 14 does not kink when the mobile tower 18 is moving backward or forward. For example, the maximum angle 148 may be the angle at which the second pipe section 64 is substantially parallel with the path 50 of the mobile tower 18.

The joint stop 70 may include four pairs of flanges 150, 152, 154, 156 and two chains 158, 160 connected to the flanges 150, 152, 154, 156 via bolts 162. The four pairs of flanges 150, 152, 154, 156 are attached to their respective pipe sections 58, 64 a distance 114 from the edge 116, 118 of the respective pipe section 58, 64 for allowing the flexible hose 66 to connect to the pipes section 58, 64. Each flange 150, 152, 154, 156 protrudes from its respective pipe section 58, 64 and includes an aperture 164 for receiving one of the bolts 162. The first two pairs 150, 152 are attached on radially opposite side portions 166, 168 of the second end 82 of the first pipes section 58. The second two pairs 154, 156 are attached on radially-opposite side portions 170, 172 of the first end 128 of the second pipe section 64. The apertures 164 of the flanges 150, 152, 154, 156 may be elongated to allow for adjusting where the bolt 162 is tightened, which affects the maximum angle 148.

The chains 158, 160 restrict the pivoting of the second pipe section 64 relative to the first pipe section 58 beyond the maximum angle 148. The chain 158 is attached to the flanges 150, 154 by receiving bolts 162 through its links on each of its ends. The bolts 162 are fastened to the flanges 150, 154 via the apertures 164. The chain 160 is attached to the flanges 152, 156 by receiving bolts 162 through its links on each of its ends. The bolts 162 are fastened to the flanges 152, 156 via the apertures 164. The length of chains 158, 160 may be substantially the same and are determinative of the maximum angle 148. Specifically, once the second pipe section 64 reaches the maximum angle 148 in either substantially horizontal direction, one of the chains 158, 160 is configured to be taut, thereby preventing further pivoting of the second pipe section 64. The joint stop 70 may include any number of devices, configurations, and/or apparatuses for limiting the pivoting of the second pipe section 64 relative to the first pipe section 58 without departing from the scope of the present invention.

Figure 6:
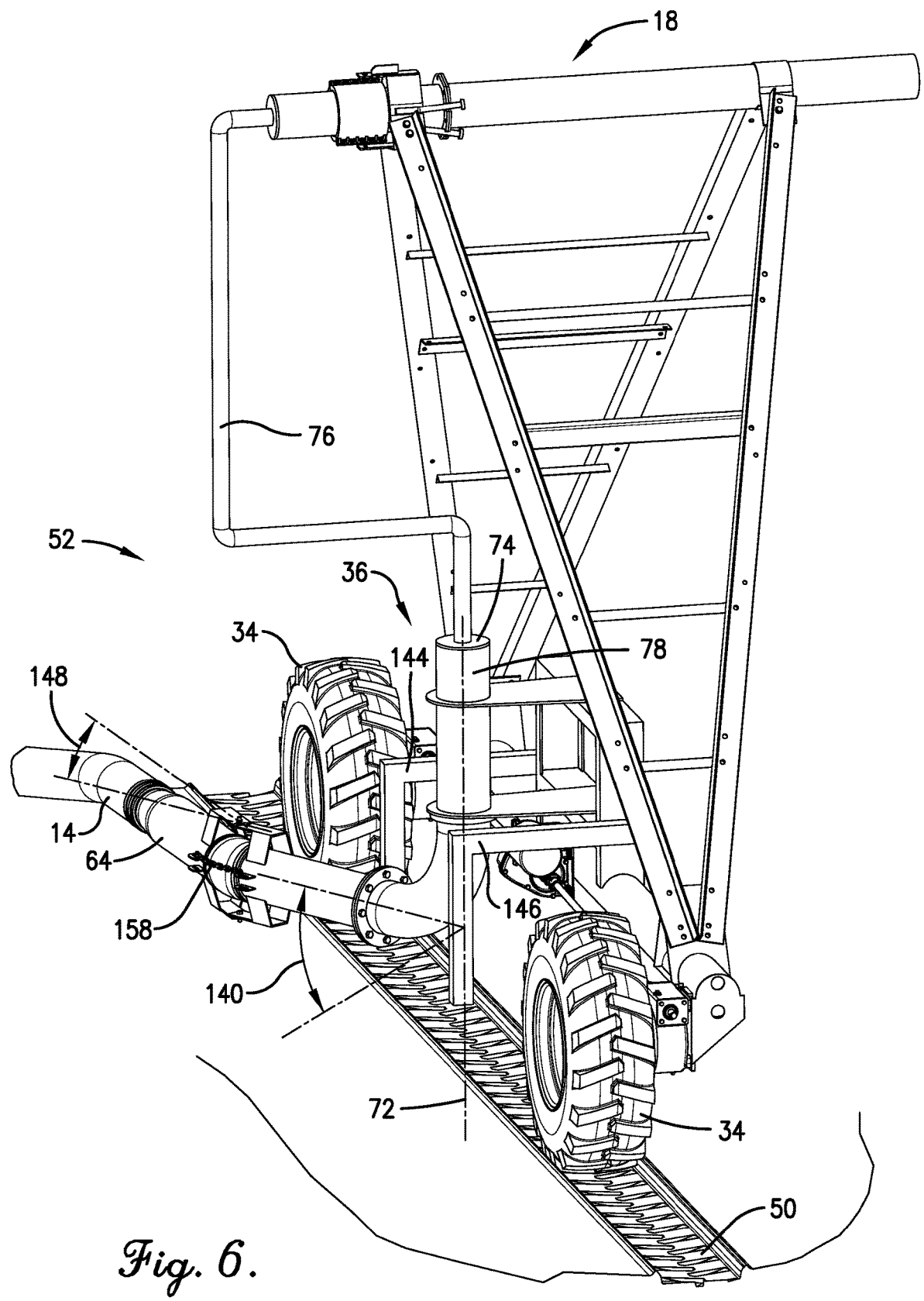
FIG. 6 is a perspective view of the mobile tower of FIG. 2 when moving forward.

In use, as the irrigation system 10 travels over the field and the wheels 34 of the mobile tower 18 travel along the path 50, the hose-pull apparatus 52 pulls the hose 14 behind. The swivel 56 is rotated to the maximum angle 140, and the first pipe section 58 abuts the bump stop 144, as shown in FIG. 6. The second pipe section 64 is at the maximum angle 148, and the chain 158 is taut. In this position, the hose-pull apparatus 52 is configured to guide the hose 14 to remain out of the path 50 of the mobile tower 18 while also avoiding pulling the hose 14 at an angle that causes too much compression so that the hose 14 kinks.

Figure 7:
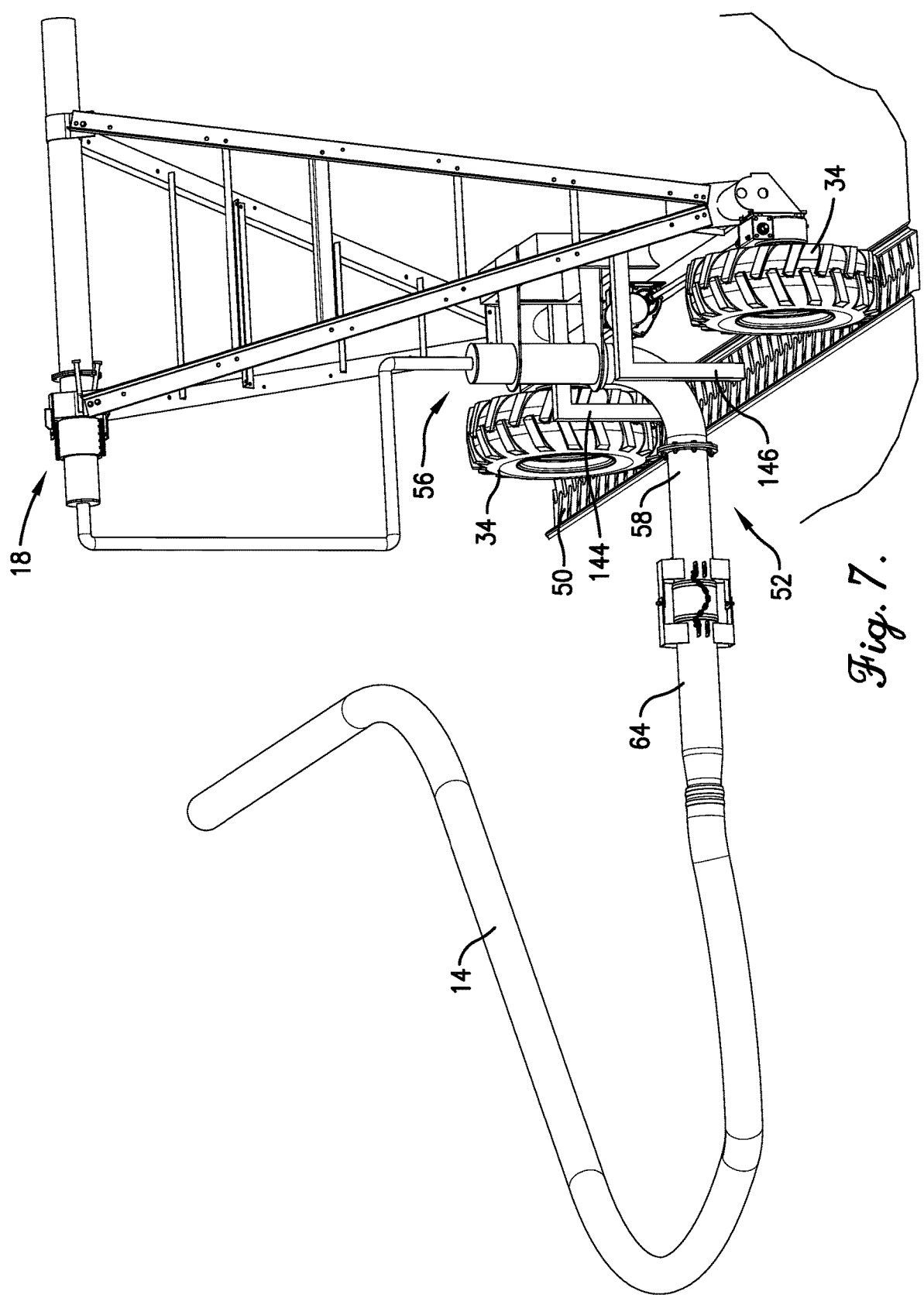
FIG. 7 is a perspective view of the mobile tower of FIG. 2 when transitioning from a forward- to a backward-moving position.
Figure 8:
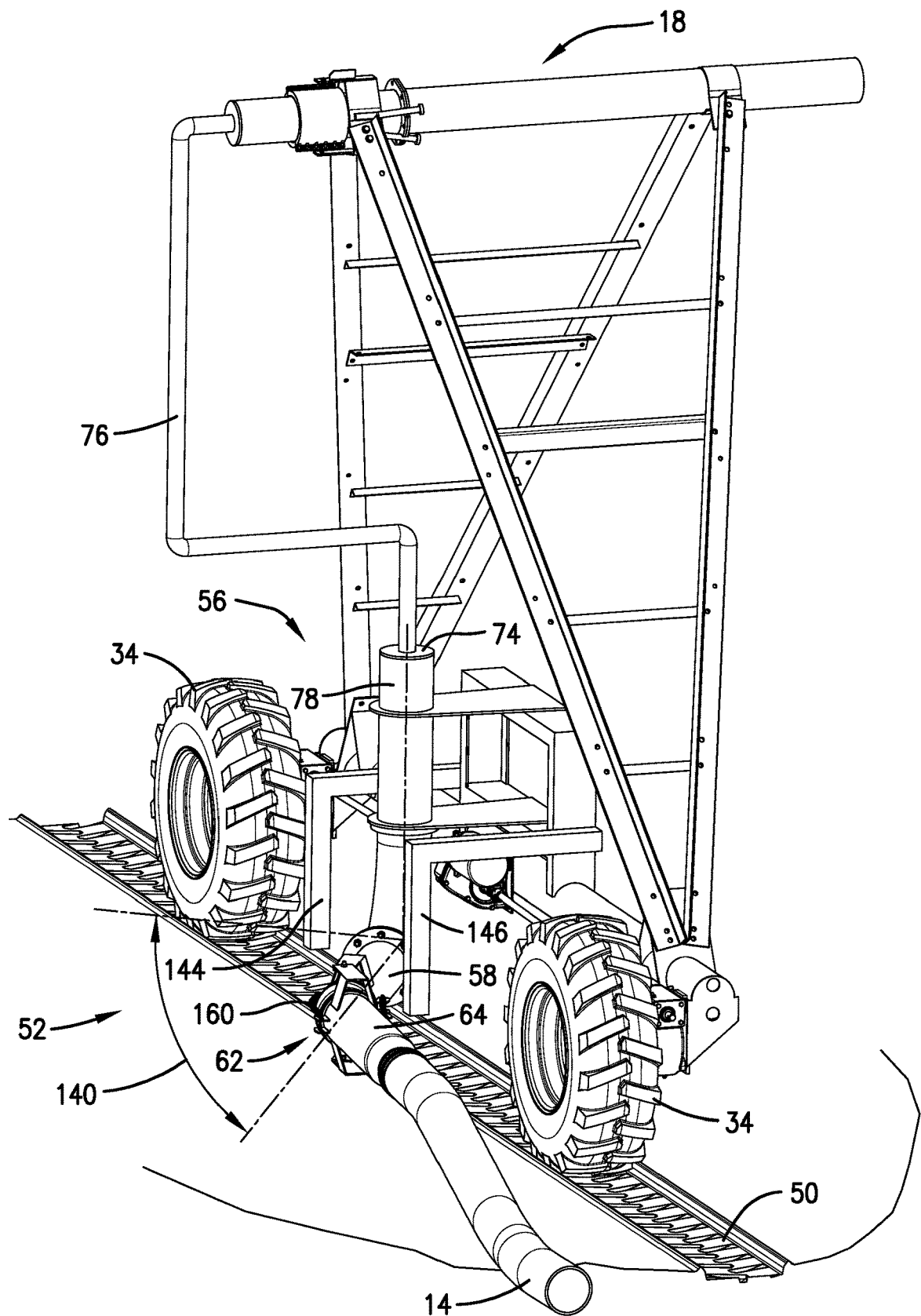
FIG. 8 is a perspective view of the mobile tower of FIG. 2 when moving backward.

Once the irrigation system 10 starts to reverse, the swivel 56 allows the first pipe section 58 to swivel away from bump stop 144 and toward bump stop 146, as depicted in FIG. 7. At first the angle of the second pipe section 64 relative to the first pipe section 58 remains constant as the tower 18 is reversing. Eventually, the second pipe section 64 pivots horizontally relative to the first pipe section 58 until it reaches the maximum angle in the other direction and the other chain 160 is taut, as depicted in FIG. 8. This prevents the hose 14 from being pulled backwards at too sharp of an angle. The pipe sections 58, 64 extend out away from the mobile tower 18 far enough to guide the hose 14 away from the path 50 of the wheels 34 while the mobile tower 18 is reversing in order to prevent the hose 14 from obstructing the mobile tower 18. The first pipe section 58 is configured to eventually abut the other bump stop 146 once the mobile tower 18 has reversed a sufficient distance back across the field.

Figure 9:
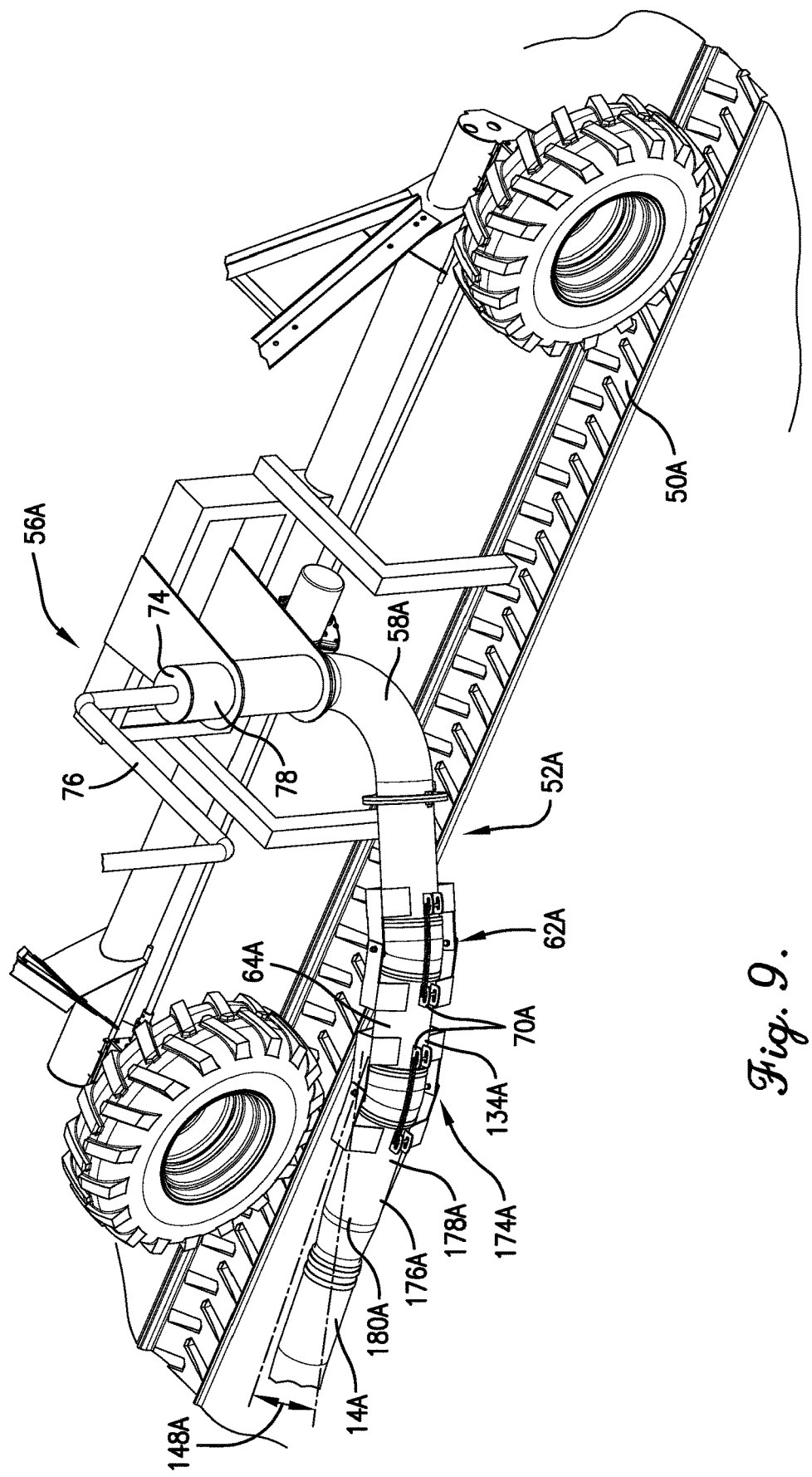
FIG. 9 is a perspective view of a mobile tower and hose-pull apparatus constructed in accordance with another embodiment of the present invention.

A hose-pull apparatus 52A constructed in accordance with another embodiment of the invention and attached to a mobile tower 18A of an irrigation system 10A is shown in FIG. 9. The hose-pull apparatus 52A may comprise substantially similar components as hose-pull apparatus 52; thus, the components of hose-pull apparatus 52A that correspond to similar components in hose-pull apparatus 52 have an CA' appended to their reference numerals.

The hose-pull apparatus 52A includes all the features of hose-pull apparatus 52 and further includes a second joint 174A, a third pipe section 176A, and a second joint stop 70A. The second joint 174A is attached to the second end 134A of the second pipe section 64A. The third pipe section 176A includes a first end 178A connected to the second joint 174A, and a second end 180A configured to be in fluid communication with the hose 14A. The second end 180A may be coupled with the hose 14A or with additional joints and pipe sections. The second joint stop 70A is configured to prevent the third pipe section 176A from pivoting beyond a maximum angle 148A relative to the second pipe section 64A. The second joint 174A, third pipe section 176A, and second joint stop 70A together further reduce compression on the hose 14A as the mobile tower 18A reverses in order to avoid kinking. This configuration is especially helpful for hoses 14A having larger diameters.

Figure 10:
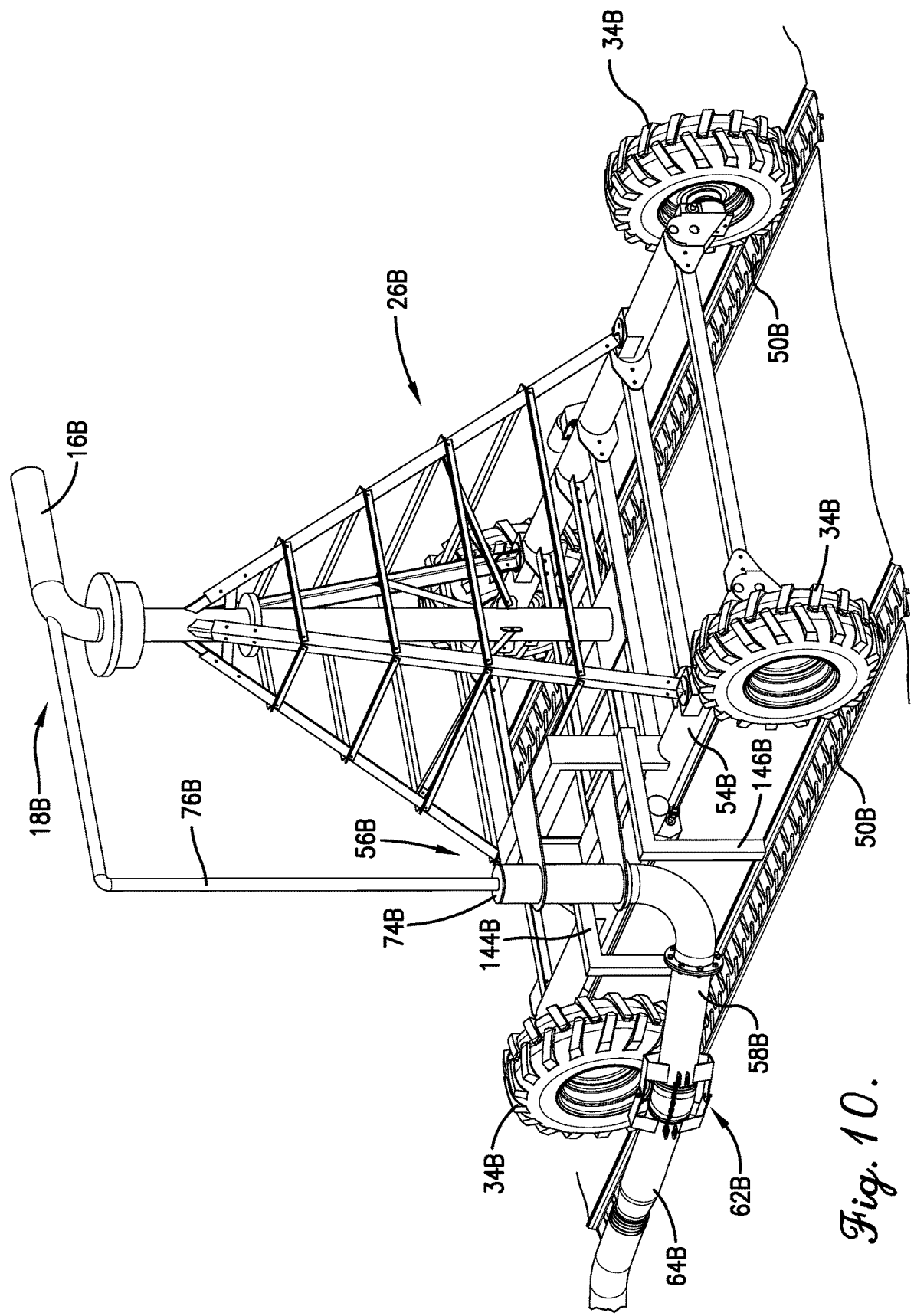
FIG. 10 is an elevated perspective view of a mobile tower and hose-pull apparatus constructed in accordance with another embodiment of the present invention.

A hose-pull apparatus 52B constructed in accordance with another embodiment of the invention and attached to a mobile tower 18B of an irrigation system 10B is shown in FIG. 10. The hose-pull apparatus 52B may comprise substantially similar components as hose-pull apparatus 52; thus, the components of hose-pull apparatus 52B that correspond to similar components in hose-pull apparatus 52 have a 'B' appended to their reference numerals.

The tower 18B comprises all the features of tower 18 except that tower 18B has four wheels 34B. The hose-pull apparatus 52B is therefore attached to frame member 54B located on a single side of the mobile tower 18B, but functions substantially the same.

It will be appreciated that the hose-pull apparatus 52 may be used with other types of irrigation systems without departing from the scope of the present invention.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. A hose-pull apparatus for connecting a fluid-supply hose to a fluid-distribution conduit of an irrigation system and for preventing kinks in the hose, the hose-pull apparatus comprising:
    a swivel configured to rotate about a vertical axis;
    a first rigid pipe section in fluid communication with the fluid-distribution conduit and having a first end connected to the swivel and a second end extending outwardly from the swivel so that the second end can pivot horizontally;
    a pivoting joint connected to the second end of the first rigid pipe section;
    a second rigid pipe section in fluid communication with the first rigid pipe section and the fluid-supply hose, the second rigid pipe section having a first end connected to the pivoting joint so that the second rigid pipe section can pivot relative to the first rigid pipe section and a second end opposite to the first end of the second rigid pipe section; and
    two or more stops configured to maintain the second end of the second rigid pipe section in a spaced relationship with the irrigation system.

2. The hose-pull apparatus of claim 1, further comprising a second pivoting joint connected to the second end of the second rigid pipe section and a third rigid pipe section in fluid communication with the second rigid pipe section and having a first end connected to the second pivoting joint so that the third rigid pipe section can pivot relative to the second rigid pipe section.

3. The hose-pull apparatus of claim 1, further comprising a flexible hose in fluid communication with the first rigid pipe section and the second rigid pipe section.

4. The hose-pull apparatus of claim 3, the joint including—
    a first collar attached to the second end of the first rigid pipe section and having a leaf extending above the flexible hose,
    a second collar attached to the first end of the second rigid pipe section and having a leaf extending above the flexible hose, and
    a pin pivotally connecting the leaf of the first collar and the leaf of the second collar.

5. The hose-pull apparatus of claim 1, wherein the second rigid pipe section extends away from the irrigation system.

6. The hose-pull apparatus of claim 1, wherein the one or more stops includes an angle-limiting stop configured to prevent the second rigid pipe section from pivoting beyond a pivot angle relative to the first rigid pipe section.

7. The hose-pull apparatus of claim 6, wherein the pivot angle is where the second rigid pipe section is parallel with a path of the irrigation system.

8. The hose-pull apparatus of claim 1, wherein the two or more stops comprises a swivel stop at least partially defining a maximum angle that the swivel can rotate about the vertical axis in at least one direction.

9. The hose-pull apparatus of claim 8, wherein the swivel stop is configured to prevent the second end of the first rigid pipe section from pivoting into a path of the irrigation system.

10. The hose-pull apparatus of claim 1, wherein the first rigid pipe section extends substantially perpendicular to the vertical axis.

11. The hose-pull apparatus of claim 1, wherein the swivel is in fluid communication with the fluid-distribution conduit and the first rigid pipe section.

12. An irrigation system mobile tower connectable to a fluid-supply hose and supporting a fluid-distribution conduit, the mobile tower comprising:
    a frame member;
    a pair of wheels attached to the frame member; and
    a hose-pull apparatus attached to the frame member for preventing kinks in the fluid-supply hose and including—
        a swivel configured to rotate about a vertical axis,
        a first rigid section having a first end connected to the swivel and a second end extending outwardly from the swivel so that the second end can be positioned at different angles relative to the frame member,
        a pivoting joint connected to the second end of the first rigid section,
        a second rigid section having a first end connected to the pivoting joint so that the second rigid section can pivot relative to the first rigid section and a second end opposite to the first end of the second rigid section,
        a swivel stop configured to prevent the first rigid section from pivoting past a maximum swivel angle relative to the frame member, and
        an angle-limiting stop configured to prevent the second rigid section from pivoting beyond a pivot angle relative to the first rigid section,
    wherein the swivel stop and the angle-limiting stop are configured to maintain the second end of the second rigid section in a spaced relationship with the pair of wheels.

13. The mobile tower of claim 12, wherein the hose-pull apparatus includes a second pivoting joint connected to the second end of the second rigid section and a third rigid section having a first end connected to the second pivoting joint.

14. The mobile tower of claim 12, wherein the pivot angle is sized so that when the hose is coupled to the second end of the second rigid section, the hose does not kink when the mobile tower is moving forward or backward.

15. The mobile tower of claim 12, wherein the swivel stop includes a bump stop attached to the frame member and configured to abut the first rigid section when the swivel reaches the maximum swivel angle.

16. The mobile tower of claim 12, wherein the swivel stop is configured so that when the hose is coupled to the second rigid section, the hose does not enter a path of the pair of wheels when the mobile tower is moving forward or backward.

17. An irrigation system connectable to a fluid-supply hose, the irrigation system comprising:
 a fluid-carrying conduit;
 a plurality of spaced-apart mobile towers configured to support and move the conduit; and
 a hose-pull apparatus attached to a first mobile tower of the plurality of mobile towers and including—
  a swivel configured to rotate about a vertical axis,
  a first rigid section having a first end connected to the swivel and a second end extending outwardly from the swivel and away from the plurality of mobile towers so that the second end can pivot horizontally,
  a pivoting joint directly connected to the second end of the first rigid section,
  a second rigid section having a first end directly connected to the pivoting joint so that the second rigid section can pivot relative to the first rigid section and a second end connected to the fluid-supply hose,
  a swivel stop at least partially defining maximum swivel angles that the swivel can rotate about the vertical axis in a direction, and
  an angle-limiting stop configured to prevent the second rigid section from pivoting beyond a pivot angle relative to the first rigid section,
 wherein the swivel stop and the angle-limiting stop are configured to maintain the second end of the second rigid section in a spaced relationship with the first mobile tower.

18. The irrigation system of claim 17, wherein the swivel stop and the angle-limiting stop are configured to prevent the fluid-supply hose from kinking when coupled to the second rigid section and when the first mobile tower is moving forwards or backwards.

* * * * *